United States Patent
Khrushchev

(10) Patent No.: US 10,408,413 B2
(45) Date of Patent: Sep. 10, 2019

(54) LIGHTING DEVICE HAVING AT LEAST ONE LIGHT SENSOR

(71) Applicant: OSRAM GmbH, Munich (DE)

(72) Inventor: Sergey Khrushchev, Regensburg (DE)

(73) Assignee: OSRAM GMBH, Munich (DE)

( * ) Notice: Subject to any disclaimer, the term of this patent is extended or adjusted under 35 U.S.C. 154(b) by 201 days.

(21) Appl. No.: 15/326,046

(22) PCT Filed: Jul. 13, 2015

(86) PCT No.: PCT/EP2015/065956
§ 371 (c)(1),
(2) Date: Jan. 13, 2017

(87) PCT Pub. No.: WO2016/012293
PCT Pub. Date: Jan. 28, 2016

(65) Prior Publication Data
US 2017/0191636 A1    Jul. 6, 2017

(30) Foreign Application Priority Data
Jul. 24, 2014    (DE) .................. 10 2014 214 601

(51) Int. Cl.
*G01C 3/08* (2006.01)
*F21S 45/10* (2018.01)
(Continued)

(52) U.S. Cl.
CPC .......... *F21S 45/10* (2018.01); *B60Q 1/0023* (2013.01); *B60Q 1/1423* (2013.01); *F21K 9/64* (2016.08);
(Continued)

(58) Field of Classification Search
CPC .......... F21S 45/10; F21S 41/28; F21S 41/135; F21S 41/14; F21S 41/16; F21K 9/64;
(Continued)

(56) References Cited

U.S. PATENT DOCUMENTS

2003/0072248 A1    4/2003  Coops et al.
2009/0016060 A1    1/2009  Nakao
(Continued)

FOREIGN PATENT DOCUMENTS

CN    1547739 A    11/2004
CN    101161036 A    4/2008
(Continued)

OTHER PUBLICATIONS

International Search Report based on application No. PCT/EP2015/065956 (9 pages and 2 pages of English translation) dated Sep. 10, 2015 (Reference Purpose Only).
(Continued)

*Primary Examiner* — Samantha K Abraham

(57) ABSTRACT

Various embodiments relate to a lighting device including at least one light source for emitting a polarized primary light beam (P), at least one luminescent material volume for at least partially converting primary light of the primary light beam (P) into secondary light (S) having a different wavelength, which luminescent material volume is arranged in a path of at least a primary light beam (P), and at least one light sensor, which is arranged at least in a part of an original path of the primary light beam (P) after the location of the luminescent material volume, wherein the light sensor is sensitive at least to the primary light and is polarization-sensitive. Various embodiments can, in particular, be applied to vehicle lighting devices, in particular vehicle lamps, e.g., headlamps, or modules thereof.

12 Claims, 4 Drawing Sheets

(51) Int. Cl.
  *F21S 41/14* (2018.01)
  *F21V 9/14* (2006.01)
  *F21V 23/04* (2006.01)
  *F21K 9/64* (2016.01)
  *B60Q 1/00* (2006.01)
  *F21S 41/20* (2018.01)
  *F21S 41/135* (2018.01)
  *F21V 9/30* (2018.01)
  *B60Q 1/14* (2006.01)
  *G01J 1/04* (2006.01)
  *G01J 1/44* (2006.01)
  *F21S 41/16* (2018.01)
  *F21S 45/70* (2018.01)
  *F21S 41/176* (2018.01)
  *B60Q 11/00* (2006.01)
  *F21Y 115/30* (2016.01)
  *F21Y 115/10* (2016.01)

(52) U.S. Cl.
  CPC .............. *F21S 41/135* (2018.01); *F21S 41/14* (2018.01); *F21S 41/16* (2018.01); *F21S 41/176* (2018.01); *F21S 41/28* (2018.01); *F21S 45/70* (2018.01); *F21V 9/14* (2013.01); *F21V 9/30* (2018.02); *F21V 23/0457* (2013.01); *G01J 1/0429* (2013.01); *G01J 1/0488* (2013.01); *G01J 1/44* (2013.01); *B60Q 11/00* (2013.01); *B60Q 2300/05* (2013.01); *F21Y 2115/10* (2016.08); *F21Y 2115/30* (2016.08); *G01J 2001/446* (2013.01)

(58) Field of Classification Search
  CPC .......... F21V 9/30; F21V 9/14; F21V 23/0457; B60Q 1/0023; B60Q 1/1423; B60Q 11/00; B60Q 2300/05; F21Y 2115/30; F21Y 2115/10; G01J 2001/446; G01J 1/0429; G01J 1/0488; G01J 1/44
  See application file for complete search history.

(56) References Cited

U.S. PATENT DOCUMENTS

| | | |
|---|---|---|
| 2009/0166508 A1 | 7/2009 | Huang et al. |
| 2011/0063115 A1 | 3/2011 | Kishimoto |
| 2011/0116520 A1 | 5/2011 | Krijn et al. |
| 2012/0050691 A1 | 3/2012 | Tsuda et al. |

FOREIGN PATENT DOCUMENTS

| | | |
|---|---|---|
| CN | 101471050 A | 7/2009 |
| CN | 102089945 A | 6/2011 |
| CN | 102385227 A | 3/2012 |
| CN | 102418905 A | 4/2012 |

OTHER PUBLICATIONS

Chinese office action including search report of corresponding application CN 201580034596.X (7 pages and 6 pages translation) dated Jul. 31, 2018.

LIGHTING DEVICE HAVING AT LEAST ONE LIGHT SENSOR

RELATED APPLICATIONS

The present application is a national stage entry according to 35 U.S.C. § 371 of PCT application No.: PCT/EP2015/065956 filed on Jul. 13, 2015, which claims priority from German application No. 10 2014 214 601.1 filed on Jul. 24, 2014, and is incorporated herein by reference in its entirety.

TECHNICAL FIELD

Various embodiments relate to a lighting device, including at least one light source for emitting a polarized primary light beam, at least one phosphor volume for at least partly converting primary light of the primary light beam into secondary light having a different wavelength, which is arranged in a path of at least one primary light beam, and at least one light sensor arranged at least in a part of an original path of the primary light beam downstream of the location of the phosphor volume. Various embodiments are applicable in particular to vehicle lighting devices, in particular vehicle luminaires, e.g. headlights, or modules thereof.

BACKGROUND

Lighting devices of the relevant type are known which have the disadvantage, however, that they cannot ascertain a low level of damage to the phosphor volume, or can ascertain that with only very high outlay, and thus are not useable in practice for early identification of damage to the phosphor volume.

SUMMARY

The object of the present disclosure is at least partly to overcome the disadvantages of the prior art and in particular to provide a simply and inexpensively implementable possibility for ascertaining damage to the phosphor volume, in particular destruction and/or detachment of the phosphor volume.

This object is achieved in accordance with the features of the independent claims. Preferred embodiments can be gathered from the dependent claims, in particular.

The object is achieved by means of a lighting device, including at least one light source for emitting a polarized primary light beam, at least one phosphor volume for at least partly converting primary light of the primary light beam into secondary light having a different wavelength, which is arranged in a path of at least one primary light beam, and at least one light sensor or light detector arranged at least in a part of an original path of the primary light beam downstream of the location of the phosphor volume, wherein the light sensor is sensitive at least to the primary light and is polarization-sensitive.

This affords the advantage that destruction and/or detachment of the phosphor volume can be ascertained at a particularly early stage using simple and inexpensive components.

The lighting device may be, in particular, a lamp, a module or a luminaire.

The at least one light source may inherently already generate a polarized primary light beam, e.g. if the at least one light source is a laser, in particular a laser diode. However, it may also generate an unpolarized light beam, wherein a polarizer is situated in the path of the primary light beam upstream of the phosphor volume, said polarizer impressing a polarization or polarization direction on the primary light beam passing through.

The at least one light source may include in particular at least one semiconductor light source. In particular, the at least one semiconductor light source includes at least one light emitting diode. If a plurality of light emitting diodes are present, they can emit light in the same color or in different colors. A color can be monochromatic (e.g. red, green, blue, etc.) or multichromatic (e.g. white). Moreover, the light emitted by the at least one light emitting diode can be an infrared light (IR LED) or an ultraviolet light (UV LED). A plurality of light emitting diodes can generate a mixed light; e.g. a white mixed light. The at least one light emitting diode can contain at least one wavelength-converting phosphor (conversion LED). The at least one light emitting diode can be present in the form of at least one individually packaged light emitting diode or in the form of at least one LED chip. A plurality of LED chips can be mounted on a common substrate ("submount"). The at least one light emitting diode can be equipped with at least one dedicated and/or common optical unit for beam guiding, e.g. at least one Fresnel lens, collimator, and so on. Instead of or in addition to inorganic light emitting diodes, e.g. on the basis of InGaN or AlInGaP, organic LEDs (OLEDs, e.g. polymer OLEDs) are generally useable as well.

The at least one semiconductor light source can alternatively or additionally include at least one diode laser. The diode laser has the advantage that the primary light emitted by it is already transversely polarized in many cases.

The phosphor volume may include one or a plurality of phosphors. A phosphor is suitable for converting incident primary light at least partly into secondary light having a different wavelength. If a plurality of phosphors is present, they may generate secondary light of mutually different wavelengths. The wavelength of the secondary light may be longer (so-called "down conversion") or shorter (so-called "up conversion") than the wavelength of the primary light. By way of example, blue or ultraviolet primary light may be converted into green, yellow, orange, red or infrared secondary light by means of a phosphor. In the case of only partial wavelength conversion, the phosphor body emits a mixture of secondary light and non-converted primary light, which mixture can serve as useful light. By way of example, white useful light may be generated from a mixture of blue, non-converted primary light and yellow secondary light. However, a full conversion is also possible, in the case of which either the primary light is no longer present or only a negligible proportion thereof is present in the useful light. A degree of conversion is dependent for example on a thickness and/or a phosphor concentration of the phosphor. If a plurality of phosphors are present, secondary light components having different spectral composition can be generated from the primary light, e.g. yellow and red secondary light. The red secondary light may be used for example to give the useful light a warmer hue, e.g. so-called "warm white". If a plurality of phosphors are present, at least one phosphor may be suitable for wavelength-converting secondary light again, e.g. green secondary light into red secondary light. Such a light wavelength-converted again from a secondary light may also be referred to as "tertiary light".

An "original path" of the primary light beam may be understood to mean, in particular, that light path which would arise in the absence of the phosphor volume. The original path may include one or a plurality of branchings. The original path may include for example a main path having the highest luminous flux or highest intensity and one or a plurality of auxiliary paths having a lower luminous flux. If the phosphor volume is present, the primary light beam will not pass substantially on its original path, but rather will be converted or scattered by the phosphor volume, as a result of which it additionally loses its polarization. By contrast, if the phosphor volume is partly or completely not present any more, the primary light beam will pass on its original path to a corresponding extent, in particular in a focused or concentrated manner and still in a polarized manner.

The light sensor detects part of the primary light present downstream of the location of the phosphor volume (present or no longer present) and may thus ascertain, for example, whether the primary light is polarized to a greater or lesser extent. A high degree of polarization indicates an at least partly removed phosphor volume.

A detection sensitivity of the light sensor for the degree of polarization of the primary light can be increased by the light sensor being insensitive to the secondary light.

In one configuration, the part of the original path of the primary light beam in which the light sensor is arranged is an auxiliary light path. In this regard, it is possible to achieve a particularly low light loss of the lighting device in the normal operation thereof (with undamaged phosphor volume present) on account of the presence of the light sensor. However, the light sensor may also be arranged in a main light path, such that it receives a particularly strong signal and/or else can serve significantly for blocking primary light emerging in an unimpeded manner.

In another configuration, the part of the original path of the primary light beam in which the light sensor is arranged is a light path which arises as a result of a reflection at an optical transmitted-light element disposed downstream of the location of the phosphor volume. In this regard, a light beam which is weaker, but still sufficiently intense for polarization detection can be branched off without additional optical elements. The transmitted-light element is inclined relative to a direction of incidence of the incident beam for problem-free arrangement of the light sensor and for simple separation of the reflected beam from the incident beam. An inclination angle may be e.g. at least 5°. The inclination angle may be in particular 30° or less, in particular 25° or less, in particular 20° or less. The inclination angle may be in particular approximately 15°. In another configuration, moreover, the transmitted-light element is a light-transmissive covering element. In this regard, the light beam passing to the light sensor can be branched off in a simple manner, without beam shaping optical elements needing to be adapted to this purpose in a complex manner.

In a further configuration, the original primary light beam is reflectable at an antireflection coating of the transmitted-light element into the part of the original path of the primary light beam in which the light sensor is arranged. On account of the high sensitivity of the polarization-dependent primary light detection, a reliably evaluable light signal can be branched off even from reflections at an antireflection coating. This is particularly advantageous since many surfaces of transmitted-light elements are provided with an antireflection coating and the absence thereof would reduce a luminous efficiency of the lighting device.

In yet another configuration, the at least one light sensor includes at least one photodiode. It may alternatively or additionally be designed, e.g. as a photocell, as a CMOS sensor, as a CCD sensor, as a phototransistor or as a photoresistor.

For detecting a detachment of the phosphor volume in a manner particularly safe for persons, it is preferred for scanning to be carried out at a frequency of at least 40 kHz.

The at least one light sensor may intrinsically only be sensitive to the primary light and/or be sensitive to a specific polarization direction. In a configuration that allows a use of particularly inexpensive sensors, a primary light filter and/or a polarization filter are/is disposed upstream of at least one light sensor. At least one light sensor may alternatively or additionally include a primary light filter and/or a polarization filter.

In one configuration, furthermore, the lighting device is configured to turn off if a predetermined threshold value of a luminous flux at at least one light sensor is reached or exceeded. An excessively high light emission of the lighting device can be prevented as a result. The predetermined threshold value can be reached, for example, if the phosphor volume is at least partly not present anymore and/or if, with phosphor volume present, a power of the light source(s) is too high.

In one configuration, moreover, the lighting device is configured to perform an action if a predetermined value of a correlation of a luminous flux at at least one light sensor with a power of at least one associated light source is reached. By means of this correlation, which correlates in particular a detector signal of the light sensor with a power of the light source, e.g. considers the ratio thereof, a change in the detector signal on account of a change in a degree of polarization of the primary light incident on the light sensor can be ascertained particularly sensitively. As a result in turn it is possible to ascertain damage to the phosphor volume at a particularly early stage and thereupon to initiate an action. The action may include for example issuing a warning indication, e.g. to a control unit of a vehicle, and/or dimming or turning off the vehicle headlight.

In another configuration, moreover, the lighting device is a vehicle lighting device, in particular for an aircraft, a watercraft or a land-based vehicle such as an automobile or a motorcycle. By way of example, the lighting device may be a vehicle headlight. The present disclosure is useable particularly advantageously in this case because headlights generally emit a particularly high luminous flux and early detection of an imminent failure of the phosphor volume affords particularly high safety advantages.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
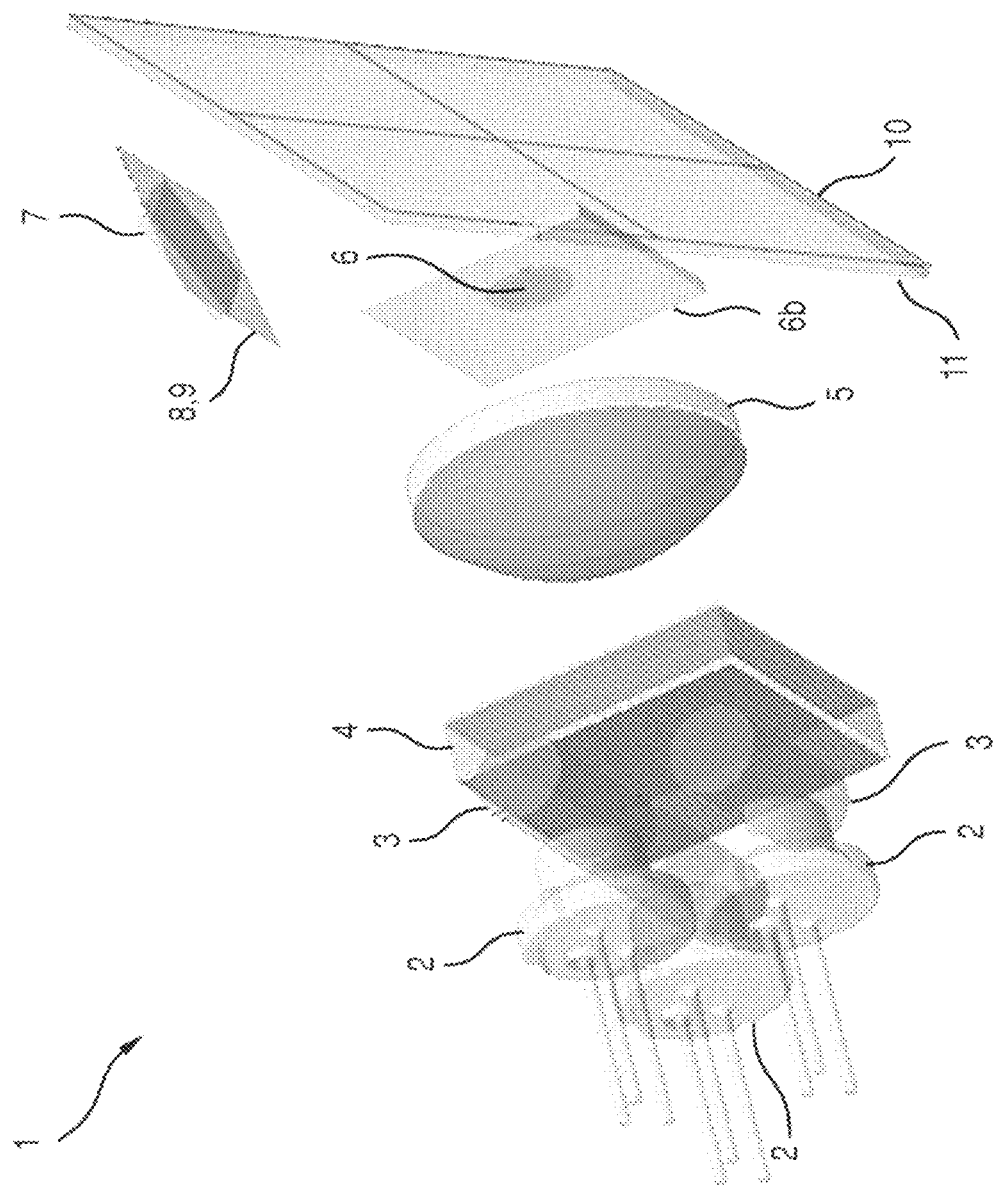
FIG. 1 shows components of a lighting device according to various embodiments in an oblique view.
Figure 2:
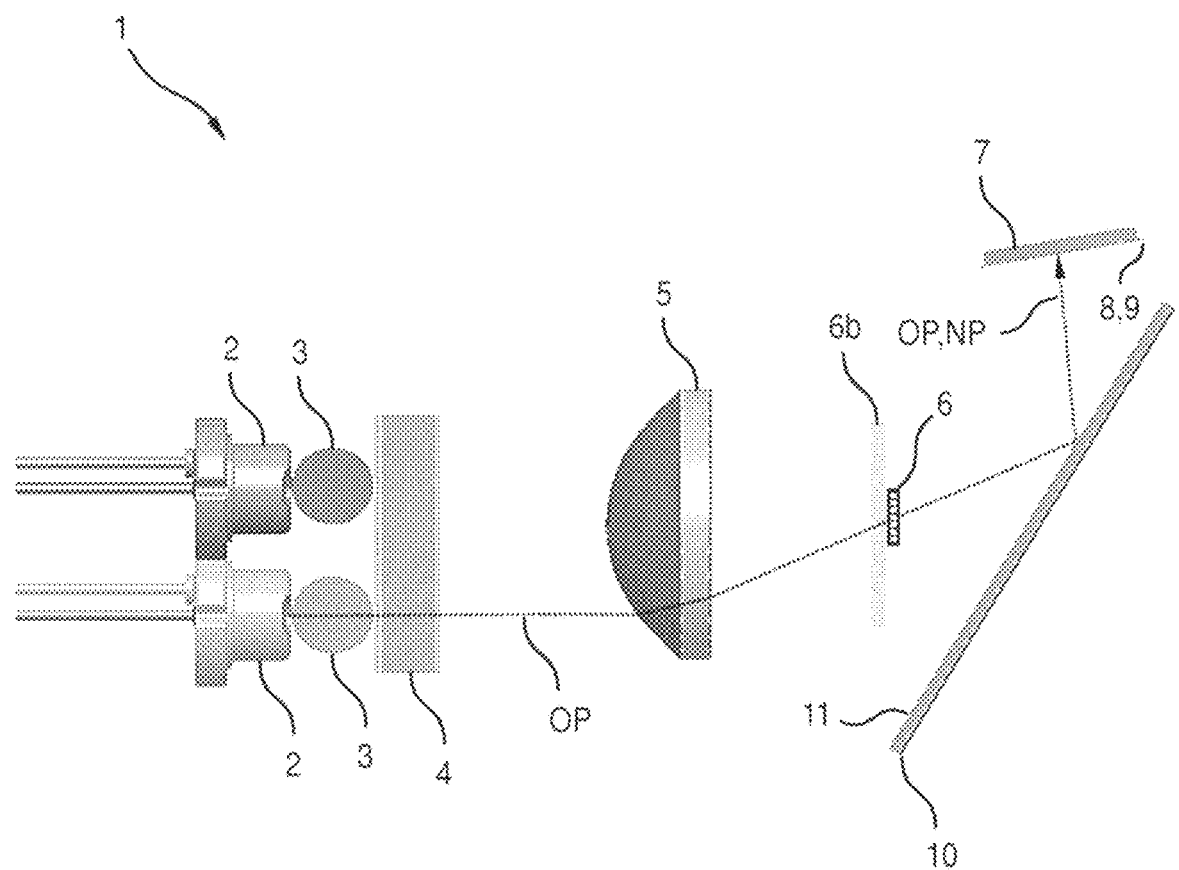
FIG. 2 shows the components from FIG. 1 in a side view.

FIG. 1 shows in oblique view selected components of a lighting device, which can be designed as a vehicle headlight 1. FIG. 2 shows the components of the vehicle headlight 1 in a side view.

Figure 3:
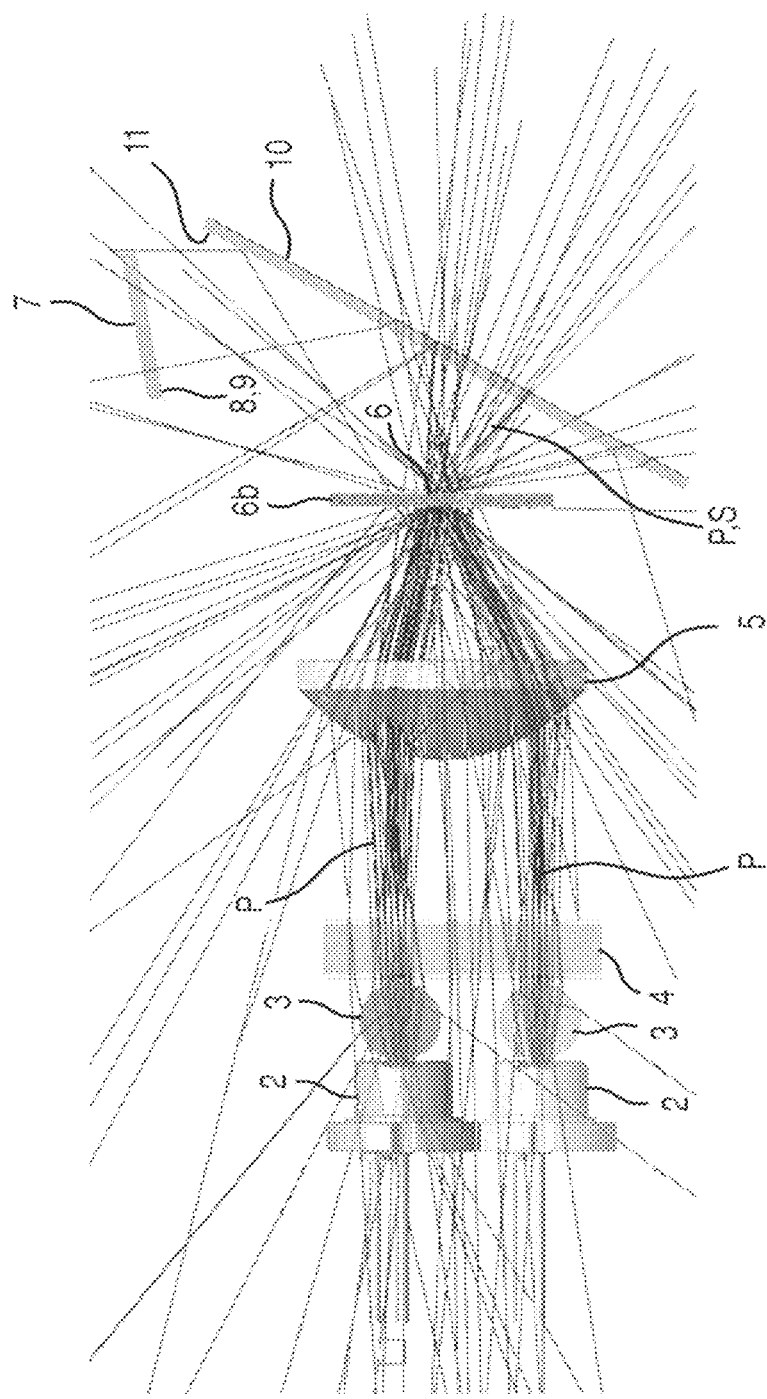
FIG. 3 shows the lighting device analogously to FIG. 1, wherein light beams are now also depicted in the case where a phosphor volume is still present.
Figure 4:
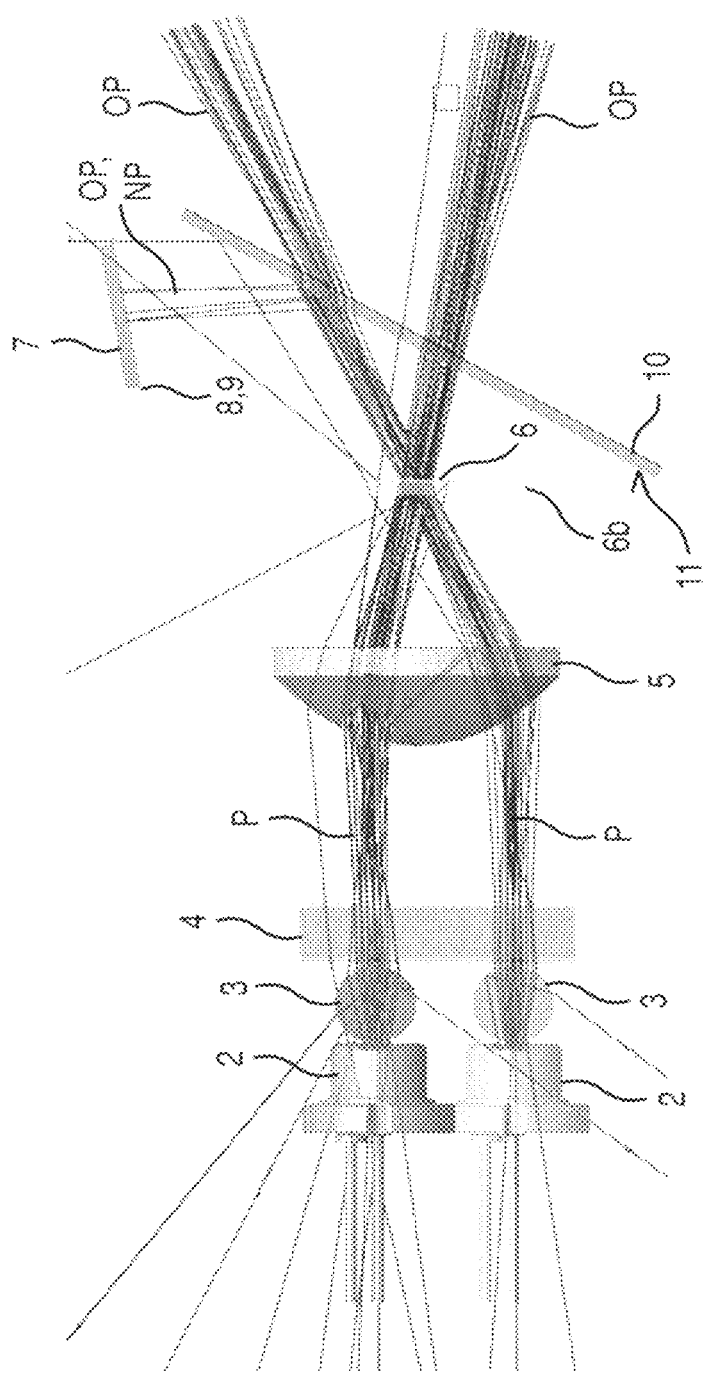
FIG. 4 shows the lighting device analogously to FIG. 1, wherein light beams are now also depicted in the case where a phosphor volume is no longer present.

The vehicle headlight 1 includes a plurality of light sources, here: three light sources, in the form of laser diodes 2. The laser diodes 2 in each case emit a beam of primary light or a primary light beam P composed of blue primary light, as also shown in FIG. 3 and FIG. 4, for example having a wavelength of 450 nm and a diode power of 1.5 watts. The planes of polarization of the laser diodes 1 are aligned such that the primary light beam P is extremely transversally polarized. The laser diodes 2 are arranged here in a plane such that their positions correspond to the corners of an isosceles triangle, since a high arrangement density is achieved in this way.

As primary optical unit, two cylindrical lenses 3 are disposed downstream of the laser diodes 2, wherein each of the cylindrical lenses 3 serves as collimator for at least one of the laser diodes 2. The upper cylindrical lens 3 in FIG. 2 serves as primary optical unit for the two upper laser diodes 2, and the lower cylindrical lens 3 serves as primary optical unit for the lower laser diode 2. In this regard, a first beam shaping of the primary light beam P can be achieved with particularly few, simply shaped transmitted-light optical units.

A common microlens array (MLA) 4 is disposed downstream of the cylindrical lenses 3 in order to further shape, e.g. also deflect, the three primary light beams P downstream of the cylindrical lenses 3.

The three primary light beams P pass from the microlens array 4 further into a focusing lens 5, by means of which they are focused onto a phosphor volume 6. The phosphor volume 6 may include one or a plurality of phosphors. The phosphor volume 6 is designed here as a laminar layer including pulverulent phosphor on a transparent substrate 6b, e.g. composed of glass or sapphire. However, the phosphor volume 6 can e.g. also be a ceramic phosphor and be present for example as a ceramic lamina.

By means of at least one phosphor present in the phosphor volume 6, the blue light of the primary light beams P is converted completely ("full conversion") or partly ("partial conversion") into secondary light S, here e.g. partly into yellow secondary light S. On the side facing away from the laser diodes 2, therefore, the phosphor volume 6 emits a blue-yellow or white mixed light P, S whose proportion of non-converted blue light is randomly polarized and thus no longer has a preferred transverse polarization direction. This is owing to the fact that the non-converted blue light is scattered in the phosphor volume 6 and the scattering thus destroys the preferred direction of the polarization.

The mixed light P, S is emitted in a comparatively widely radiative manner through a light-transmissive covering sheet 10. It may then be projected e.g. by an imaging optical unit (not illustrated) into a far field in front of the vehicle headlight 1.

The vehicle headlight 1 furthermore includes a light sensor in the form of a photodiode 7, and arranged upstream of the light-sensitive detector element (not illustrated) thereof is a filter ("blue filter" 8) that is transmissive to the blue light but is not transmissive or is only slightly transmissive to the yellow secondary light. The photodiode can have for example an effective sensor area of 1 mm$^2$ or less, e.g. of 0.36 mm$^2$. The photodiode 7 furthermore has a polarization filter 9 arranged upstream of its light-sensitive detector element. The photodiode 7 or 7 to 9 is thus particularly sensitive to the blue light of a primary light beam P in a specific polarization direction. However, it does not detect the secondary light S, that is to say is insensitive thereto.

The light sensor 7 to 9 is arranged in a part of an ("original") path OP of the primary light beam P downstream of the location of the phosphor volume 6 which arises if the phosphor volume 6 or the phosphor is or were not present. This may be the case, for example, if the phosphor volume 6 has completely or partly detached and/or been destroyed. The light sensor 7 to 9 may be arranged in a main branch or main light path or in an auxiliary branch or auxiliary light path NP of the original path OP. A main light path is distinguished by the fact that, in the case of light splitting, said main light path continues to guide or has a larger proportion of a luminous flux, while an auxiliary light path NP continues to guide or has a smaller proportion. In this embodiment, the light sensor 7 to 9 is arranged in an auxiliary light path NP of the original path OP, namely in an auxiliary light path NP that arises if primary light not influenced (e.g. scattered) by the phosphor volume 6 is reflected at the covering sheet 10. This is the case even if the covering sheet 10 has an antireflection coating 11 at the location of the reflection, in particular at a side facing the laser diodes 2. Despite the antireflection coating 11, 0.3 to 0.5% of the light impinging obliquely on the covering sheet 10 is reflected. The covering sheet 10 is aligned obliquely with respect to the original path OP, e.g. at an angle of approximately 15°.

If, therefore, as shown in FIG. 3, the phosphor volume 6 is present, with laser diodes 2 being activated, the mixed light P, S is emitted widely at that side of said phosphor volume which faces away from the laser diodes 2. That proportion of the mixed light P, S which is reflected from the covering sheet 10 into the photodetector 7 to 9 is small. The proportion of the yellow secondary light S is filtered out by the blue filter 8, and then an "incorrectly" polarized proportion is filtered out from the residual, transmitted proportion of the blue primary light by the polarization filter 9. The proportion of the transmitted primary light with nondirectional polarization is small, in particular negligibly small. In particular, a sensor signal in the range of the background noise may be generated by said primary light with nondirectional polarization. If, however, as shown in FIG. 4, the phosphor volume 6 is at least partly not present anymore, at least part of the incident primary light beam P can pass without interaction through the (intended) location of the phosphor volume 6, that is to say without being converted or scattered. As a result, the primary light beam P then passes downstream of the location of the phosphor volume 6 along its "original" path and is not scattered widely at the location of the phosphor volume 6. It then impinges on the covering sheet 10 for the most part at an angle such that the proportion reflected at the covering sheet 10 is incident practically completely on the photodiode 7. The blue filter 8 practically completely transmits the blue primary light. The polarization filter 9 is arranged or set such that the extremely polarized primary light (owing to its not being scattered) is likewise practically completely transmitted.

Consequently, when the phosphor volume 6 is absent, a considerably higher luminous flux is ascertained compared with when the phosphor volume 6 is present. On account of the detection sensitivity of the photodiode 7 that is dependent on the polarization behavior, a measurably higher luminous flux is detectable even if the phosphor volume 6 is only partly not present anymore or damaged. The detection sensitivity is significantly better than without consideration of the polarization or without polarization filtering. Consequently, even small absent phosphor volumes (holes) having a diameter in the millimeters and submillimeters range can be reliably detected.

The vehicle headlight 1 is configured, in particular, to turn off automatically if a predetermined threshold value of a luminous flux at the photodetector 7 is reached or exceeded. An excessively high light emission of the vehicle headlight 1 can be prevented as a result. The predetermined threshold value can be reached, for example, if the phosphor volume 6 is at least partly not present any more and/or if, with phosphor volume 6 present, a power of the laser diode(s) 2 is too high. The vehicle headlight 1 may include a control device for this purpose. Alternatively, the vehicle headlight 1 may not turn off automatically, but rather only output a signal about reaching or exceeding the threshold value to the vehicle, which then turns off the vehicle headlight 1.

The vehicle headlight 1 is also configured to perform an action if a predetermined value of a correlation of a luminous flux at the photodiode 7 with a power of at least one associated laser diode 2 is reached. By means of this correlation, which correlates in particular a detector signal of the photodiode 7 with a power of the laser diode 2, e.g. considers the ratio thereof, a change in the detector signal on account of a change in a degree of polarization of the blue primary light incident on the photodiode 7 to 9 can be ascertained particularly sensitively. As a result in turn it is possible to ascertain damage to the phosphor volume 6 at a particularly early stage and thereupon to initiate an action. The action may include for example issuing a warning indication, e.g. to a control unit of a vehicle, and/or dimming or turning off the vehicle headlight 1.

Generally, "a(n)", "one", etc. can be understood to mean a singular or a plural, in particular in the sense of "at least one" or "one or a plurality", etc., as long as this is not explicitly excluded, e.g. by the expression "exactly one", etc. Moreover, a numerical indication can encompass exactly the indicated number and also a customary tolerance range, as long as this is not explicitly excluded.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting device, comprising two or more light sources for emitting a polarized primary light beam (P), a phosphor volume for at least partly converting primary light of the primary light beam (P) into secondary light (S) having a different wavelength, which is arranged in a path of at least one primary light beam (P), a focusing lens to focus the polarized primary light beam (P) from the two or more light sources onto the phosphor volume, and
   at least one light sensor arranged at least in a part of an original path of the primary light beam (P) downstream of the location of the phosphor volume, wherein
   the light sensor is sensitive at least to the primary light and is polarization-sensitive.

2. The lighting device as claimed in claim 1, wherein the light sensor is insensitive to the secondary light (S).

3. The lighting device as claimed in claim 2, wherein a part of the original path (OP) of the primary light beam (P) in which the light sensor is arranged is an auxiliary light path (NP).

4. The lighting device as claimed in claim 1, wherein a part of the original path (OP) of the primary light beam (P) in which the light sensor is arranged is an auxiliary light path (NP).

5. The lighting device as claimed in claim 1, wherein a part of the original path (OP) of the primary light beam (P) in which the light sensor is arranged is an auxiliary light path (NP) which arises as a result of a reflection at an optical transmitted-light element disposed downstream of the location of the phosphor volume.

6. The lighting device as claimed in claim 5, wherein the transmitted-light element is a light-transmissive covering element.

7. The lighting device as claimed in claim 6, wherein the original primary light beam is reflectable at an antireflection coating of the transmitted-light element into an auxiliary part (NP) of the original path (OP) of the primary light beam in which the light sensor is arranged.

8. The lighting device as claimed in claim 5, wherein the original primary light beam is reflectable at an antireflection coating of the transmitted-light element into an auxiliary part of the original path (OP) of the primary light beam in which the light sensor is arranged.

9. The lighting device as claimed in claim 1, wherein the light sensor comprises a photodiode comprising a primary light filter and a polarization filter.

10. The lighting device as claimed in claim 1, wherein the lighting device is configured to turn off if a predetermined threshold value of a luminous flux at least one light sensor is reached or exceeded.

11. The lighting device as claimed in claim 1, wherein the lighting device is configured to perform an action if a predetermined value of a correlation of a luminous flux at least one light sensor with a power of at least one associated light source is reached.

12. The lighting device as claimed in claim 1, wherein the lighting device is a vehicle headlight.

* * * * *